(12) United States Patent
Wieland et al.

(10) Patent No.: US 9,381,485 B2
(45) Date of Patent: Jul. 5, 2016

(54) ENCAPSULATION METHOD FOR COMPOUNDS

(75) Inventors: Robert B. Wieland, Cincinnati, OH (US); Jon C. Soper, Union, KY (US)

(73) Assignee: Givaudan S.A., Vernier (CH)

( * ) Notice: Subject to any disclaimer, the term of this patent is extended or adjusted under 35 U.S.C. 154(b) by 1522 days.

(21) Appl. No.: 11/795,901

(22) PCT Filed: Jan. 20, 2006

(86) PCT No.: PCT/CH2006/000045
§ 371 (c)(1),
(2), (4) Date: Oct. 24, 2007

(87) PCT Pub. No.: WO2006/079236
PCT Pub. Date: Aug. 3, 2006

(65) Prior Publication Data
US 2008/0113018 A1    May 15, 2008

Related U.S. Application Data

(60) Provisional application No. 60/646,935, filed on Jan. 25, 2005.

(51) Int. Cl.
*B01J 13/02* (2006.01)
*B01J 13/20* (2006.01)

(52) U.S. Cl.
CPC . *B01J 13/02* (2013.01); *B01J 13/20* (2013.01)

(58) Field of Classification Search
CPC .................................. B01J 13/02; B01J 13/20
See application file for complete search history.

(56) References Cited

U.S. PATENT DOCUMENTS

| | | | |
|---|---|---|---|
| 3,516,943 A | | 6/1970 | Brynko, et al. |
| 4,230,687 A | * | 10/1980 | Sair et al. ........................ 424/485 |
| 4,285,984 A | | 8/1981 | Huber |
| 5,607,708 A | * | 3/1997 | Fraser et al. .................... 426/96 |
| 5,759,599 A | | 6/1998 | Wampler et al. |
| 6,039,901 A | | 3/2000 | Soper et al. |
| 6,045,835 A | | 4/2000 | Soper et al. |
| 6,056,949 A | | 5/2000 | Menzi et al. |
| 6,066,342 A | * | 5/2000 | Gurol et al. ..................... 424/687 |
| 6,106,875 A | | 8/2000 | Soper et al. |
| 6,123,974 A | | 9/2000 | Gautschi et al. |
| 6,222,062 B1 | | 4/2001 | Anderson et al. |
| 6,306,818 B1 | | 10/2001 | Anderson et al. |
| 6,325,859 B1 | | 12/2001 | De Roos et al. |
| 6,325,951 B1 | | 12/2001 | Soper et al. |
| 6,335,047 B1 | | 1/2002 | Daniher et al. |
| 6,348,618 B1 | | 2/2002 | Anderson et al. |
| 6,387,431 B1 | | 5/2002 | Gautschi |
| 6,426,108 B1 | | 7/2002 | Gautschi |
| 6,436,461 B1 | | 8/2002 | Bouwmeesters et al. |
| 6,440,912 B2 | | 8/2002 | McGee et al. |
| 6,451,366 B1 | | 9/2002 | Daniher et al. |
| 6,482,433 B1 | | 11/2002 | De Roos et al. |
| 6,610,346 B1 | | 8/2003 | Acuna et al. |
| 6,689,740 B1 | | 2/2004 | McGee et al. |
| 6,805,893 B2 | | 10/2004 | Acuna et al. |
| 2001/0008635 A1 | | 7/2001 | Quellet et al. |
| 2003/0165587 A1 | | 9/2003 | Binggeli et al. |

FOREIGN PATENT DOCUMENTS

| | | | | |
|---|---|---|---|---|
| EP | 0687417 | * | 6/1994 | ............... A23B 4/12 |
| WO | WO 01/03825 | | 1/2001 | |
| WO | WO 2004/034791 A | | 4/2004 | |

OTHER PUBLICATIONS

Food Starch Technology, 1996, National Starch and Chemical Company, pp. 1-17, Last Accessed Feb. 4, 2011, http://eu.foodinnovation.com/pdfs/foodstarch.pdf.*
UK Food Guide, E415 Xanthan Gum, Last Accessed Feb. 10, 2011, 1 page, http://www.ukfoodguide.net/e415.htm.*
Snow drift farm, DryFlo AF Pure, Last Accessed Feb. 10, 2011, 2 pages, http://www.snowdriftfarm.com/dryflo.html.*

\* cited by examiner

*Primary Examiner* — Trevor Love
(74) *Attorney, Agent, or Firm* — Curatolo Sidoti Co., LPA; Joseph G. Curatolo; Salvatore A. Sidoti

(57) ABSTRACT

A method of encapsulating a volatile, water-soluble substance in capsules having a hydrogel shell and an oily interior includes (i) providing blank capsules having a hydrogel shell and an oily interior and (ii) immersing the capsules in an aqueous solution of the volatile, water-soluble substance for a time sufficient for them to load to a desired extent with the volatile, water-soluble substance. The aqueous solution additionally has dissolved therein to saturation point at least one water-soluble, non-volatile material. The method permits the easy and durable encapsulation of volatile materials that hitherto have been difficult to encapsulate.

11 Claims, No Drawings

ENCAPSULATION METHOD FOR COMPOUNDS

CROSS REFERENCE TO RELATED APPLICATIONS

This application is a national stage application of International Application No. PCT/CH2006/000045, filed 20 Jan. 2006, which claims the benefit of Application No. 60/646,935, filed 25 Jan. 2005 from which applications priority is claimed, and which applications are incorporated herein by reference as if fully written out below.

The invention relates to a method of encapsulating liquid flavour or fragrance compounds, and to loaded capsules produced thereby.

BACKGROUND

The loading of substances such as flavours or fragrances into microcapsules is well known to the art. In a typical process, there are provided blank capsules comprising a hydrogel shell and an oily interior. These capsules are loaded with the desired substance by immersing them in an aqueous solution of the substance to be loaded for sufficient time for loading to take place. The water allows the transport of the substances through the water-containing hydrogel shell into the oil core by aqueous diffusion according to its partition coefficient equilibrium.

While this process has proved generally very successful, it has proved problematic for some volatile, water-soluble flavours. The partition coefficient of some such flavors is such that these materials tend to remain within the wall rather than be absorbed into the oily interior. This leads to a disproportionate amount of substance being trapped within the walls, which in turn leads to a greater volatile loss after recovery of the capsules. Examples of important substances in the flavours field subject to this problem include butyric acid, acetaldehyde, acetic acid, diacetyl, acetoin and furfuryl alcohol.

SUMMARY

It has now been found that it is possible to overcome this problem to a substantial degree. The invention therefore provides a method of providing capsules having a hydrogel shell and an oily interior and encapsulating a volatile, water-soluble substance, comprising the steps of (i) providing blank capsules having a hydrogel shell and an oily interior; and (ii) immersing said capsules in an aqueous solution of the volatile, water-soluble substance for a time sufficient for them to load to a desired extent with the volatile, water-soluble substance; the aqueous solution additionally comprising dissolved therein to saturation point at least one water-soluble, non-volatile material that is soluble in the aqueous solution.

DETAILED DESCRIPTION

The capsules that may be used in this invention are any capsules having a hydrogel shell and an oil core. Such capsules are well known to the art and are available commercially as blank capsules, ready for loading. Preferred examples of capsules that may be used in the method of this invention are those described in U.S. Pat. No. 6,045,835 and U.S. Pat. No. 6,106,875.

The aqueous solution used to load the capsules has water as the predominant solvent, but other water-miscible solvents may also be present in minor proportions, typically of no more than 10% by weight. Some of these may be co-solvents that assist in the solution of substances whose solubility in water is marginal. In addition, the substances themselves may be materials dissolved in water-miscible solvents and these solvents may become part of the solvent.

The volatile, water-soluble substance may be any such substance whose durable encapsulation is desired. Such substances are particularly difficult to encapsulate, and it is a feature of this invention that substances such as acetaldehyde can, for the first time, be successfully stably and durably encapsulated. Other substances in the flavour field that have been difficult to encapsulate and that now can be with relative ease include butyric acid, acetic acid, diacetyl, acetoin and furfuryl alcohol.

Loading the blank capsules to any desired extent is carried out in the known manner by mixing blank capsules and an aqueous solution of the substance desired to be loaded. The time necessary to load the capsules will vary, depending on the natures of the capsules and the aqueous solution, but it typically lies between 5 minutes and 48 hours, 10 minutes-30 hours usually being sufficient for most purposes. For the volatile materials for which this method is particularly suitable, the loading times are generally quite short, of the order of minutes rather than hours. The mixing of the components may be carried out with art-recognised equipment.

The water containing the substance to be loaded additionally comprises dissolved therein at least one non-volatile, water-soluble substance. This substance is present to saturation point, by which is meant that essentially no more of this non-volatile, water-soluble substance will dissolve in the water at ambient temperature. Complete saturation is not necessary, so it is not necessary to try to get more to dissolve. It is sufficient to add the water-soluble substance with stirring until no more will dissolve.

Any non-volatile, water-soluble substance is suitable for use in this invention, provided that it has no undesirable properties. For example, it should a substance whose presence has no undesirable effects of any kind. These will vary from system to system, but the skilled person, using the ordinary skill of the art, will readily perceive what these are in each case and allow for them. For example, in the case of loading flavours, all materials should be food-grade.

Typical examples of non-volatile, water-soluble substances suitable for use in this invention include carbohydrates, sugars, sugar alcohols and food-derived materials rich in water-soluble materials, such as starch, wheat and other grains.

In an especially preferred embodiment of the invention, the process comprises a third step, that of adding a desiccating agent to the capsules after loading has been competed. By "desiccating agent" is meant a substance that is capable of absorbing water, preferably to a high degree. It is believed, without restricting the invention in any way, that the desiccating agent has the effect of at least partially drying out the capsule walls, thereby making them less likely to allow encapsulated substance to escape.

In some cases, the non-volatile, water-soluble substance hereinabove described will also have this desiccating effect and will therefore perform both functions. The desirability of this third step varies depending on the nature of the substance encapsulated. As a general rule, the lower the volatility, the less effect the desiccating agent has on the encapsulated substance. Thus, for maximum durability of capsules containing, say, acetaldehyde, the use of desiccating agent is highly desirable, and in some cases even essential. Suitable desiccating agents must naturally be food-grade materials. Examples of suitable desiccating agents include salt, sugar, acid, and grains, such as wheat.

Especially useful desiccating agents for use in this invention are vegetable starches, particularly potato starch. Such starches are added in dry form to the loaded capsules.

It has been found that capsule loading performed according to this invention is especially effective with very volatile substances, which are difficult to encapsulate by any other method. High levels of loading are easily achieved and the capsules retain the encapsulated substance to a higher degree than is usually the case with such capsules.

The invention is further illustrated by reference to the following examples, which describe embodiments and which should not be construed as limiting the invention in any way.

Example 1

Preparation of Capsules Containing Acetaldehyde and Comparative Testing

Dry crosslinked capsules (67.5 g) and 12.5 g of a 59.55% fructose solution in water (weight/weight) are placed in a stainless steel mixing bowl (Hobart Lab Scale Mixer) and stirred for 15-minutes. The hydrated capsules are transferred to a closed glass container and refrigerated at 6 degrees Celsius for 1 hour.

20 g of acetaldehyde is then added to the hydrated capsules and mixed for 5 minutes. Potato starch (100 g) is then added to the capsules and the mixture is mixed for 5 minutes. These are capsules A The process hereinabove described is repeated with batches of identical capsules, with the following alterations: Substitution of 12.5 g of water for the fructose solution and omitting the addition of the potato starch at the end. These are designated capsules B.
(ii) As (i), but including the addition of potato starch as per the preparation of capsules A. These are designated capsules C.
(iii) As per preparation of capsules A, but omitting the potato starch. These are designated capsules D.

The various capsules are tested for acetaldehyde loss by means of gas chromatography using a flame ionisation detector. The results are as follows:

| Capsules | Time | Total % Acetaldehyde |
|---|---|---|
| A | t = 0 Hour | 14.47% |
|  | t = 50 Hours | 13.84% |
| TOTAL LOST |  | 0.63% |
| B | t = 0 Hour | 20.28% |
|  | t = 50 Hours | 0.12% |
| TOTAL LOST |  | 20.16% |
| C | t = 0 Hour | 14.52% |
|  | t = 50 Hours | 1.20% |
| TOTAL LOST |  | 13.33% |
| D | t = 0 Hour | 20.19% |
|  | t = 50 Hours | 0.22% |
| TOTAL LOST |  | 19.97% |

It can readily be seen that the capsules prepared according to the invention were appreciably better in acetaldehyde retention than capsules made according to the prior art.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A method of encapsulating a volatile, water-soluble substance, comprising:
   (i) providing blank cross-linked capsules having a hydrogel shell and an oily interior;
   (ii) immersing said capsules in an aqueous solution of the volatile, water-soluble substance for a time sufficient for them to load to a desired extent with the volatile, water-soluble substance, the aqueous solution having dissolved therein to saturation point at least one water-soluble sugar, wherein the volatile, water soluble substance is selected from the group consisting of butyric acid, acetic acid, diacetyl, acetoin, acetaldehyde and furfuryl alcohol; and
   (iii) adding potato starch as a desiccating agent to the loaded capsules, the desiccating agent at least partially inducing desiccation of the hydrogel shell, wherein the weight ratio of potato starch to volatile, water soluble substance is at least about 5:1.

2. The method according to claim 1, in which the desiccating agent is dried potato starch.

3. The method according to claim 1, in which the volatile, water-soluble substance is acetaldehyde.

4. The method according to claim 1, wherein the sugar comprises fructose.

5. The method according to claim 1, in which the volatile, water-soluble substance is acetaldehyde, the desiccating agent is dried potato starch, and the water-soluble, non-volatile substance is fructose.

6. A method of encapsulating a volatile, water-soluble substance, comprising:
   (i) providing blank cross-linked capsules having a hydro gel shell and an oily interior;
   (ii) immersing said capsules in an aqueous solution of the volatile, water-soluble substance for a time sufficient for them to load to a desired extent with the volatile, water-soluble substance, the aqueous solution having dissolved therein to saturation point at least one water-soluble sugar, wherein the volatile, water soluble substance is selected from the group consisting of butyric acid, acetic acid, diacetyl, acetoin, acetaldehyde and furfuryl alcohol,
   wherein the at least one water-soluble sugar, at least partially induces desiccation of the hydrogel shell, and
   (iii) adding potato starch as a desiccating agent to the loaded capsules, the desiccating agent at least partially inducing desiccation of the hydrogel shell, wherein the weight ratio of potato starch to volatile, water soluble substance is at least about 5:1.

7. The method according to claim 6, in which the desiccating agent is dried potato starch.

8. The method according to claim 6, wherein the sugar comprises fructose.

9. The method according to claim 6, in which the volatile, water-soluble substance is acetaldehyde, the desiccating agent is dried potato starch, and the water-soluble, non-volatile substance is fructose.

10. A method of encapsulating a volatile, water-soluble substance, comprising:
   (i) providing blank cross-linked capsules having a hydrogel shell and an oily interior;
   (ii) immersing said capsules in an aqueous solution of the volatile, water-soluble substance comprising acetaldehyde for a time sufficient for them to load to a desired extent with acetaldehyde, the aqueous solution having fructose dissolved therein to saturation point; and (iii) treating the loaded capsules with potato starch as a desiccating agent, the desiccating agent at least partially inducing desiccation of the hydrogel shell, wherein the weight ratio of potato starch to volatile, water soluble substance is at least 5:1.

11. The method according to claim 10, in which the desiccating agent is dried potato starch.

* * * * *